(12) United States Patent
Zhang et al.

(10) Patent No.: US 7,902,128 B2
(45) Date of Patent: Mar. 8, 2011

(54) WATER-IN-OIL EMULSIONS WITH HYDROGEL DROPLETS BACKGROUND

(75) Inventors: Ying Zhang, Sugar Land, TX (US); Gregory P. Perez, Pearland, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

(21) Appl. No.: 12/111,429

(22) Filed: Apr. 29, 2008

(65) Prior Publication Data
US 2009/0270280 A1   Oct. 29, 2009

(51) Int. Cl.
*C09K 8/588* (2006.01)
*C09K 8/68* (2006.01)
*C09K 8/528* (2006.01)
*E21B 43/00* (2006.01)
*C04B 28/02* (2006.01)

(52) U.S. Cl. ......... 507/221; 507/110; 507/118; 507/119; 507/211; 507/224; 507/228; 507/230; 507/937; 166/305.1

(58) Field of Classification Search ............... 507/221, 507/110, 118, 119, 211, 224, 228, 230, 937; 166/305.1
See application file for complete search history.

(56) References Cited

U.S. PATENT DOCUMENTS

| | | |
|---|---|---|
| 4,792,412 A | 12/1988 | Heilweil |
| 5,001,231 A | 3/1991 | Zapico |
| 5,106,516 A | 4/1992 | Mueller et al. |
| 5,161,615 A * | 11/1992 | Hutchins et al. ............ 166/295 |
| 5,232,910 A | 8/1993 | Mueller et al. |
| 5,252,554 A | 10/1993 | Mueller et al. |
| 5,318,954 A | 6/1994 | Mueller et al. |
| 5,318,956 A | 6/1994 | Mueller et al. |
| 5,403,822 A | 4/1995 | Mueller et al. |
| 5,465,792 A | 11/1995 | Dawson et al. |
| RE36,066 E | 1/1999 | Mueller et al. |
| 5,869,434 A | 2/1999 | Mueller et al. |
| 6,068,054 A | 5/2000 | Bragg |
| 6,169,058 B1 | 1/2001 | Le et al. |
| 6,258,755 B1 | 7/2001 | House et al. |
| 6,562,762 B2 | 5/2003 | Cowan et al. |
| 6,823,940 B2 | 11/2004 | Reddy et al. |
| 6,837,316 B2 | 1/2005 | Reddy et al. |
| 6,848,519 B2 | 2/2005 | Reddy et al. |
| 6,887,832 B2 | 5/2005 | Kirsner et al. |
| 7,066,285 B2 | 6/2006 | Shaarpour |
| 7,147,067 B2 | 12/2006 | Getzlaf et al. |
| 7,151,077 B2 | 12/2006 | Prud'homme et al. |
| 7,156,194 B2 | 1/2007 | Nguyen |
| 7,207,387 B2 | 4/2007 | Eoff et al. |
| 7,278,485 B2 | 10/2007 | Kirsner et al. |
| 7,306,040 B1 | 12/2007 | Robb et al. |
| 7,341,117 B2 | 3/2008 | Wylie et al. |
| 2003/0036484 A1 | 2/2003 | Kirsner |
| 2003/0144153 A1 | 7/2003 | Kirsner et al. |
| 2004/0152603 A1 | 8/2004 | Kirsner et al. |
| 2005/0115710 A1 * | 6/2005 | Kotlar et al. ............ 166/295 |
| 2006/0016596 A1 | 1/2006 | Pauls et al. |
| 2006/0172893 A1 | 8/2006 | Todd et al. |
| 2006/0211580 A1 | 9/2006 | Wang et al. |
| 2006/0231255 A1 | 10/2006 | Oyler et al. |
| 2006/0234875 A1 | 10/2006 | Oyler et al. |
| 2007/0078060 A1 | 4/2007 | Kirsner et al. |
| 2007/0078061 A1 | 4/2007 | Kirsner et al. |
| 2007/0078062 A1 | 4/2007 | Kirsner et al. |
| 2007/0082822 A1 | 4/2007 | Kirsner et al. |
| 2008/0015118 A1 | 1/2008 | Oyler et al. |
| 2008/0032900 A1 | 2/2008 | Kirsner et al. |
| 2008/0112984 A1 | 5/2008 | Schulte et al. |

FOREIGN PATENT DOCUMENTS

WO   WO98/06929   2/1998

OTHER PUBLICATIONS

Norman et al. "Properties and Early Field Results of a Liquid Gelling Agent for Acid", SPE 7834, 1978.
Burrows et al. "Benchmark Performance: Zero Barite Sag and Significantly Reduced Downhole Losses with the Industry's First Clay-Free Synthetic-Based Fluid", SPE 87138, 2004.
International Search Report and Written Opinion for PCT/GB2009/000954, dated Aug. 5, 2009.
International Preliminary Report on Patentability for International Patent Application No. PCT/GB2009/000954 dated Nov. 2, 2010.

* cited by examiner

*Primary Examiner* — Timothy J. Kugel
*Assistant Examiner* — Atnaf Admasu
(74) *Attorney, Agent, or Firm* — Craig W. Roddy; McDermott, Will & Emery (57) ABSTRACT

Methods and compositions are provided that include a water-in-oil composition comprising an oil-based continuous phase and a discontinuous phase that comprises at least a plurality of hydrogel droplets and a method comprising providing a water-in-oil emulsion comprising an oil-based continuous phase and a discontinuous phase that comprises at least a plurality of hydrogel droplets; and placing the water-in-oil emulsion in a well bore penetrating a subterranean formation. Additional methods are also provided.

24 Claims, 5 Drawing Sheets

WATER-IN-OIL EMULSIONS WITH HYDROGEL DROPLETS BACKGROUND

BACKGROUND

The present invention relates to water-in-oil emulsions and associated methods. More specifically, at least in some embodiments, the present invention relates to water-in-oil emulsions that comprise an oil-based continuous phase and a discontinuous phase in which at least a portion of the discontinuous phase droplets are hydrogel droplets, and associated methods.

Emulsions usually comprise two immiscible phases. The two immiscible phases usually include, but are not limited to, a continuous (or external) phase and a discontinuous (or internal) phase. The discontinuous phase usually exists in droplets in the continuous phase. The terms "droplet" and "droplets" as used herein refer to discrete portions of the discontinuous phase in the continuous phase, and do not imply any particular shape, size, or other characteristic of the droplets themselves. Two varieties of emulsions include, but are not limited to, oil-in-water and water-in-oil. Oil-in-water emulsions usually include, but are not limited to, a fluid at least partially immiscible in an oil-based fluid (usually an aqueous-based fluid) as the continuous phase and an oil-based fluid as the discontinuous phase. Water-in-oil emulsions are the opposite, having the oil-based fluid as the continuous phase and a fluid at least partially immiscible in the oil-based fluid (usually an aqueous-based fluid) as the discontinuous phase. Water-in-oil emulsions may be also referred to as invert emulsions.

Such emulsions have been used widely in oil and gas applications. For instance, emulsions may be used in the oil and gas industry for subterranean treatment applications, including drilling, production, and completion operations. Water-in-oil emulsions may be used because they may have superior performance characteristics when compared with water-based drilling fluids in some situations, e.g., when there is an abundance of water reactive materials in a well bore. These superior performance characteristics may include, e.g., better lubrication of the drilling strings and downhole tools, thinner filter cake formation, and better hole stability.

One problem that may be encountered when using water-in-oil emulsions is that such emulsions typically may undergo natural degradation processes, including droplet coalescence and Ostwald ripening, until the two phases, which may be at least partially immiscible at least initially, separate and the emulsion no longer exists. Having an unstable water-in-oil emulsion may be problematic because if the emulsion destabilizes, it may not have consistent, reliable properties. This problem may be exacerbated by the physical forces that the water-in-oil emulsion may undergo when being used in subterranean applications, such as thermal, mechanical, and chemical stresses. Surfactant-based emulsifying agents may be useful in water-in-oil emulsions for emulsion stabilization, especially when used in subterranean applications. However, such surfactant-based emulsifying agents may not always be effective at combating the tendency to coalesce, especially at elevated temperatures as often encountered in subterranean applications.

Water-in-oil emulsions often include, but are not limited to, a surfactant-based emulsifying agent. It is believed that traditional surfactant-based emulsifying agents may have a propensity for droplet coalescence, which may be undesirable. Surfactant-based emulsifying agents typically are thought to form a meta-stable structure around the internal water droplets, in which the hydrophilic headgroups are in contact with the water phase while the hydrocarbon (hydrophobic) tails are in the continuous oil phase. This meta-stable structure at the water/oil interface may have defects as surfactant molecules continuously diffuse in and out. Such defects may increase the water/oil interfacial tension and promote water droplet coalescence, which may result in eventual emulsion instability. This coalescence may be especially problematic in subterranean formations when these emulsions are subjected to formation fluids that may be present in the formation.

The aqueous droplets of the discontinuous phase may be subject to undesired coalescence and flocculation, which may lead to droplet size growth. This growth may be especially problematic in subterranean drilling operations because this growth may lead to flipping of the emulsion, resulting in a change to an oil-in-water emulsion. Flipping of water-in-oil emulsions may be detrimental to a subterranean operation not only because of the drastic changes in fluid properties, but also because it may introduce a water phase in direct contact with the formation. This may be undesirable as it can lead to swelling of the clay and possibly formation damage. Direct contact with the water phase that often has high salinity also may be likely to increase the rate and magnitude of corrosion upon downhole equipment. Additionally, unintended water droplet coalescence could also result in localized changes in oil/water ratio, viscosity properties, fluid density, solids settling, loss of stability of the emulsion, and create a greater temperature sensitivity of the emulsion.

SUMMARY

The present invention relates to water-in-oil emulsions and associated methods. More specifically, at least in some embodiments, the present invention relates to water-in-oil emulsions that comprise an oil-based continuous phase and a discontinuous phase in which at least a portion of the discontinuous phase droplets are hydrogel droplets, and associated methods.

In one embodiment, the present invention provides a water-in-oil emulsion composition comprising an oil-based continuous phase and a discontinuous phase that comprises at least a plurality of hydrogel droplets.

In another embodiment, the present invention provides a method comprising providing a water-in-oil emulsion comprising an oil-based continuous phase and a discontinuous phase that comprises at least a plurality of hydrogel droplets; and placing the water-in-oil emulsion in a well bore penetrating a subterranean formation.

In another embodiment, the present invention provides a method comprising providing drilling fluid comprising a water-in-oil emulsion, wherein the water-in-oil emulsion comprises an oil-based continuous phase and a discontinuous phase that comprises at least a plurality of hydrogel droplets; and drilling at least a portion of a well bore in a subterranean formation with the drilling fluid.

In another embodiment, the present invention provides a method of preparing a water-in-oil emulsion comprising hydrogel droplets comprising: providing a water-in-oil emulsion comprising an oil-based continuous phase and a discontinuous phase; adding a monomer, an initiator, and optionally a crosslinking agent to the water-in-oil emulsion; and allowing the monomer to disperse in the discontinuous phase and react with the initiator and optionally the crosslinking agent to form at least a plurality of hydrogel droplets.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention. These drawings are primarily for the purpose of illustrating the interfacial characteristics of some of the invented systems.

DESCRIPTION OF PREFERRED EMBODIMENTS

The present invention relates to water-in-oil emulsions and associated methods. More specifically, at least in some embodiments, the present invention relates to water-in-oil emulsions that comprise an oil-based continuous phase and a discontinuous phase in which at least a portion of the discontinuous phase droplets are hydrogel droplets, and associated methods.

The term "hydrogel droplet" as used herein refers to a particle that comprises a network of polymer chains that are substantially water-insoluble, which may be a colloidal gel in which water is the dispersion medium. These may be discrete hydrophilic, viscoelastic, non-Newtonian gel-like particles. In some embodiments, the hydrogel droplets may be super absorbent (i.e., they can contain over 99% water). These particles, in some instances, may possess a degree of flexibility very similar to natural tissue due to their significant water content.

There may be several potential advantages to the methods and compositions of the present invention, only some of which are alluded to herein. One of the many potential advantages may be that the water-in-oil emulsions of the present invention may be more stable against droplet coalescence than typical water-in-oil emulsions. Another such advantage may be that the use of the water-in-oil emulsion of the present invention may have the ability of absorbing intruding formation water into the internal phase of the emulsion without breaking the emulsion. Another potential advantage may be that the use of the water-in-oil emulsion of the present invention may give more control over fluid loss than use of conventional water-in-oil emulsions. Another potential advantage of the present invention may be that the use of the water-in-oil emulsion may be used at greater temperatures than conventional water-in-oil emulsions. Another potential advantage of the water-in-oil emulsion of the present invention may be that it is easily exchangeable with conventional water-in-oil emulsions.

In some embodiments, the present invention provides water-in-oil emulsion compositions that comprise an oil-based continuous phase and a discontinuous phase in which at least a portion of the droplets are hydrogel droplets. In additional embodiments, the present invention provides methods, at least some of which include, but are not limited to, providing a water-in-oil emulsion comprising an oil-based continuous phase and a discontinuous phase that comprises at least a plurality of hydrogel droplets, and placing the water-in-oil emulsion in a well bore penetrating a subterranean formation.

In some embodiments, the oil-based continuous phase in the water-in-oil emulsion compositions may comprise an oil-based fluid. The oil-based fluid may be any suitable oil-based fluid. Examples of suitable oil-based fluids may include, but are not limited to, ester based fluids, mineral oils, internal olefins, alpha olefins, diesel oils, crude oils, paraffin oils, low toxicity mineral oils, olefins, esters, amides, amines, synthetic oils such as polyolefins, polydiorganosiloxanes, siloxanes, organosiloxanes, ethers, acetals, dialkylcarbonates, hydrocarbons, any combination thereof, and any derivative thereof. Examples of suitable oil-based fluids may include, but are not limited to, those commercially available from Halliburton Energy Services, Inc., in Duncan, Okla., under the trade names ACCOLADE™, PETROFREE®, PETROFREE® LV and PETROFREE® S.F. Factors that determine which oil-based fluid will be used in a particular application may include, but are not limited to, the cost and performance characteristics of the oil-based fluid. An additional factor that may be considered is the polarity of the oil-based fluid. For example, diesel oils may be generally more polar than paraffin oils. Other factors that may be considered are environmental compatibility and regional drilling practices. For example, in North Sea applications, an ester or internal olefin (IO) may be preferred. In the Gulf of Mexico, ACCOLADE™ or a low toxicity mineral oil may be preferred. One skilled in the art with the benefit of this disclosure will be able to choose a suitable oil-based fluid for a particular application in view of these considerations. In certain exemplary embodiments of the present invention, the oil-based fluid may be crude oil.

In some embodiments, the oil-based fluid may be present in the water-in-oil emulsion in the range of from about 50% to about 100% by volume of the water-in-oil emulsion. In some embodiments, the continuous phase may be present in any suitable range including ratios of continuous phase to discontinuous phase of 70:30, 80:20, 90:10, and 95:5.

As stated above, emulsions usually comprise two immiscible phases. The two immiscible phases usually include, but are not limited to, a continuous (or external) phase and a discontinuous (or internal) phase. The discontinuous phase usually exists in droplets in the continuous phase.

In some embodiments, the discontinuous phase of the water-in-oil emulsion compositions of the present invention may be characterized by at least a portion of the droplets being discrete hydrogel droplets. These are referred to herein as "hydrogel droplets." To form these hydrogel droplets, in some embodiments, at least a portion of the discontinuous phase may be gelled to form individual hydrogel droplets. The remaining droplets of the discontinuous phase that are not hydrogel droplets are referred to herein as "nonoleaginous fluid droplets." The hydrogel droplets may be comprised of physically crosslinked networks of soluble polymer molecules with molecules of the nonoleaginous fluid trapped within the network, thereby creating a three-dimensional network swollen by a solvent within each hydrogel droplet. In some embodiments, the discontinuous phase droplets may comprise about 0.5% to about 100% hydrogel droplets, the remainder being nonoleaginous fluid droplets. In alternative embodiments, hydrogel droplets may comprise about 50% to about 80% of a discontinuous phase in an emulsion, the remainder being nonoleaginous fluid droplets.

The nonoleaginous fluid used in the discontinuous phase, either in the hydrogel droplets and/or the nonoleaginous fluid droplets, may be any fluid that is partially immiscible in the continuous phase. Suitable examples may include, but are not limited to, aqueous-based fluids, glycerin, glycols, polyglycol amines, polyols, any derivative thereof, and any combination thereof. Aqueous-based fluids may include, but are not limited to, fresh water, sea water, salt water, and brines (e.g., saturated salt waters). Suitable brines may include, but are not limited to, heavy brines. Brines may comprise $H_2O$ soluble salts. In certain exemplary embodiments, suitable $H_2O$ soluble salts may comprise sodium chloride, calcium chloride, calcium bromide, zinc bromide, potassium carbonate, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, any combination thereof, and any derivative thereof. In some embodiments, the discontinuous phase may be present in any suitable range including ratios of discontinuous phase to continuous phase of 30:70, 20:80, 10:90 and 5:95.

In some embodiments, the hydrogel droplets may comprise a physically crosslinked network of soluble polymer molecules with molecules of the nonoleaginous fluid trapped within the network, thereby creating a three-dimensional network swollen by a solvent within each hydrogel droplet. The soluble polymers may be any soluble polymer which may form a hydrogel droplet, with or without an additive, for use in a water-in-oil emulsion. Examples of suitable polymers can include, but are not limited to, polybutylene succinate, polybutylene succinate-co-adipate, polyhydroxybutyrate-valerate, polyhydroxybutyrate-covalerate, polycaprolactone, polyester amide, starch-based polymers, polyethylene terephthalate-based polymers, sulfonated polyethylene terephthalate, polyethylene oxide, polyethylene, polypropylene, polyvinyl alcohol, aliphatic aromatic copolyester, polyacrylic acid, polyacrylamide, polyvinylpyrrolidone, polysaccharides (such as dextran or cellulose), chitin, chitosan, proteins, aliphatic polyesters, polylactic acids, poly(glycolides), poly(ε-caprolactones), poly(hydroxy ester ethers), poly(hydroxybutyrates), poly(anhydrides), polycarbonates, poly(orthoesters), poly(amino acids), poly(ethylene oxides), poly(propylene oxides), poly(phosphazenes), polyester amides, polyamides, any derivative thereof, and any copolymer or blend thereof.

The hydrogel droplets can be any shape, for example, round. Any shape may be suitable. Depending on the method in which the hydrogel droplets in the discontinuous phase are created, the shape of the hydrogel droplets can vary. For instance, in some circumstances, the hydrogel droplets formed may be a spherical shape, for example, when they are crosslinked or polymerized within the internal phase while the water-in-oil emulsion is being emulsified. In some circumstances, the hydrogel droplets formed may be more angled in nature. For instance, irregular-shaped hydrogel droplets may exist in the emulsion when a hydrogel is pre-made, comminuted, and dispersed in a water-in-oil emulsion. The pre-made hydrogel may also be processed so that the solvent within the gel is extracted. The gel can be pulverized and have the ability of absorbing the solvent when in contact with the latter. The hydrogel in its powder form may be dispersed in an emulsion, in which the internal phase is a solvent of the hydrogel. After absorbing part or all the internal phase solvent, the hydrogel droplet in the emulsion may have either spherical or angular shape. One of ordinary skill in the art would be able to select an appropriate shape of the hydrogel droplets based upon the characteristics of the subterranean formation in which the hydrogel droplets would be used, the temperature of the subterranean formation, the degree of stability required of the hydrogel droplets, and the costs. Again, however, no particular shape is critical for use in the present invention.

The hydrogel droplets may be of any suitable size. In some embodiments the hydrogel droplets may be smaller hydrogel droplets with diameters in the range of about 0.5 micron to about 5 microns. In some embodiments the hydrogel droplets may be larger, with diameters in the range of about 5 microns to about 20 microns. The larger hydrogel droplets may be any size up to about 100 microns in diameter. One of ordinary skill in the art would be able to select an appropriate size of the hydrogel droplets based upon the characteristics of the subterranean formation in which the hydrogel droplets would be used, the temperature of the subterranean formation, the degree of stability required of the hydrogel droplets, and the costs.

The hydrogel droplets may have a broad range of internal viscosities. When the hydrogel droplets are more crosslinked, it is believed that they become less fluid-like; when the hydrogel droplets are less crosslinked, it is believed that they become more fluid-like. The hydrogel droplets internal viscosities may be in the range about 10 to about $10^7$ Pa alternatively about $10^2$ to about $10^6$ Pa. One of ordinary skill in the art would be able to select a desired internal viscosity for the hydrogel droplets used based upon the characteristics of the subterranean formation in which the hydrogel droplets would be used, the temperature of the subterranean formation, the degree of stability required of the hydrogel droplets, and the costs.

The water-in-oil emulsion compositions of this invention may be made by any suitable method. One example of a method for forming an emulsion of the present invention comprises an in situ polymerization of at least a plurality of the discontinuous phase droplets to form hydrogel droplets. Another example involves adding preformed hydrogel droplets to an oil-in-water emulsion so that the hydrogel droplets form part of the discontinuous phase of the emulsion. Other methods may be appropriate as well as recognized by one skilled in the art with the benefit of this disclosure.

In some embodiments of an in situ polymerization method, a water-in-oil emulsion comprising an oil-based continuous phase and a non-oleaginous discontinuous phase may be treated so as to form a plurality of hydrogel droplets in the discontinuous phase of the emulsion. In an example of this process, suitable monomers, initiators, accelerators and crosslinking agents may be added to the water-in-oil emulsion. The monomers, initiators, and crosslinking agents may be dissolved in at least a portion of the droplets of the discontinuous phase. The monomers may undergo a polymerization reaction with the aid of an initiator under appropriate temperatures, to form a partially cross-linked polymer soluble in a discontinuous phase droplet. In some embodiments, the use of an initiator may not be required if strict temperature control is maintained. In some embodiments, if the soluble polymers formed have a sufficiently high molecular weight, they may induce high viscoelasticity in the non-oleaginous droplets, thereby forming hydrogel droplets; whereas if the soluble polymers formed do not have a high molecular weight, they may be crosslinked with the assistance of a crosslinking agent to render high viscoelasticity within the droplets thus facilitating the formation of hydrogel droplets. Depending on the concentration, molecular weight and degree of cross-linking, the polymer network may swell in the presence of the non-oleaginous fluid to create hydrogel droplets having different rheological properties.

The temperature of the emulsion may be adjusted to obtain appropriate rate of the reaction process for a desired reaction time. If strict temperature control is maintained, then an accelerator may not be necessary. Typically, an accelerator is necessary if the reaction takes place at room temperature. At elevated temperature such as 130° F. (depending on the reaction systems), usually the polymerization can be accomplished without accelerators.

A pH adjustment may be advisable to facilitate a particular reaction. Therefore, a pH adjusting compound may be added to the composition. For instance, if the reaction prefers an acidic environment, potassium hydrogen phthalate can be used as a buffering agent.

Suitable examples of monomers for the hydrogel droplets may include, but are not limited to, any suitable water soluble monomer. Some examples include, but are not limited to, butylenes, succinate-co-adipate, hydroxybutyrate-valerate, hydroxybutyrate-covalerate, caprolactones, amides, starch-based monomers, ethylene terephthalate-based monomers, sulfonated ethylene terephthalate, ethylene oxides, ethylenes, propylene, vinyl alcohols, aliphatic aromatic esters, acrylic acid, acrylamide, vinyl pyrrolidone, monosaccharides (such as dextran or cellulose), chitins chitosans, proteins, aliphatic esters, lactic acids, glycolides, ε-caprolactones, hydroxy ester ethers, hydroxybutyrates, anhydrides, carbonates, orthoesters, amino acids, ethylene oxides, propylene oxides, phosphazenes, etheresters, ester amides, amides, blends of any of these monomers, and any copolymer thereof, and any derivative thereof. The amount of monomer needed to form the hydrogel droplets in at least some of the discontinuous phase droplets may depend on the desired rheological properties sought for the resulting hydrogel droplets. Generally speaking, it is believed that the more monomer used, the more viscous the hydrogel formed may be, whereas the less used, then the less viscous the hydrogel formed may be. In some embodiments, the amount of monomer added to the water-in-oil emulsion may be from about 0.5% to about 10% by weight of the nonoleaginous fluid in the water-in-oil emulsion.

Optionally, a crosslinking agent may be used to crosslink the polymer molecules to form the hydrogel droplets. Any crosslinking agent that is suitable for crosslinking the chosen monomers/polymers may be used in conjunction with the methods described herein. Examples of suitable crosslinking agents include, but are not limited to, N,N'-methylenebisacrylamide, ethylene glycol diacrylate, poly(ethylene glycol) diacrylate, ethylene glycol dimethacrylate, poly(ethylene glycol) dimethacrylate, ethylene glycol divinyl ether. Depending on the desired rheological properties of the hydrogel droplets, the degree of cross-linking can be varied by adjusting the concentration of crosslinkers from 0.01% to 5% by weight of the total monomer.

If used, the polymerization initiators may include, but are not limited to, any suitable initiator. The choice of initiator will be guided by the monomer(s) used in the polymerization. In some embodiments, examples of suitable initiators may include, but are not limited to, water-soluble or water-dispersible halogen molecules, azo compounds and organic peroxides or persulfates. Organic peroxide initiators may include, but are not limited to, tert-butyl, tert-amyl and cumene hydroperoxide, benzoyl peroxide, diethylether peroxide and acetone peroxide. Accelerators may include, but are not limited to, triethylene amine, tetramethylethylenediamine, tetraethylethylenediamine, and the like. A typical concentration of initiators used in a deoxygenized environment may be around 0.005-0.02 M.

In some embodiments, the emulsion compositions of the present invention may comprise a discontinuous phase that has at least a plurality of hydrogel droplets that may be formed prior to their addition to the discontinuous phase. The preformed hydrogel droplets may be made by a process comprising forming a hydrogel, and then chopping up the hydrogel to form smaller preformed hydrogel droplets. These preformed hydrogel droplets may comprise swollen water soluble polymers from the larger hydrogel. The larger hydrogel may be made using the polymers and the polymerization processes described above. The preformed hydrogel droplets may then be introduced into a water-in-oil emulsion, so that the continuous phase is the oil-based fluid and the discontinuous phase comprises at least a plurality of preformed hydrogel droplets. The amount of preformed hydrogel droplets introduced into the emulsion may be in the range from about 5% to 50% by volume of the oil-based fluid, alternatively from about 10% to about 30% by weight of the oil-based fluid.

In certain embodiments, optionally, the water-in-oil emulsion compositions of the present invention may further comprise an emulsifying agent. It is believed that, at least in some embodiments, an emulsifying agent may act to stabilize a water-in-oil emulsion. Suitable emulsifying agents may include, but are not limited to, any suitable surfactant-based emulsifying agent that is capable of enhancing the stability of an emulsion. Examples of suitable emulsifying agents may include, but are not limited to, sulfonates, alkyl sulfates, monoesters of polyalkoxylated sorbitan, a polyester polyols, aliphatic alcohol esters, aromatic alcohol esters, ammonium salts of polyacrylic acid, and ammonium salts of a 2-acrylamido-2-methylpropane sulfonic acid/acrylic acid copolymer. Examples of suitable sulfonate emulsifying agents include, but are not limited to, alkylsulfonate, alkylarylsulfonate, α-olefin sulfonate, diphenyl ether sulfonate and α-sulfo fatty acid methyl ester. Combinations of suitable emulsifying agents also may be used. An example of a suitable emulsifying agent comprises a tall oil fatty acid diethanolamide, such as AMADOL® 511, available from Akzo Nobel Surface Chemistry, Chicago, Ill. Another example of a suitable emulsifying agent comprises a polyoxyethylene (5) sorbitan monooleate, such as TWEEN® 81, available from Uniqema, New Castle, Del. Another example of a suitable emulsifying agent comprises a sorbitan monooleate, such as ALKAMULS® SMO, available from Rhone Poulenc, Inc., Paris, France. Other examples of suitable emulsifying agents are INVERMUL®, EZ MUL, LE SUPERMUL®, and LE MUL®, available from Halliburton Energy Services, Inc. Houston, Tex. Combinations of these emulsifying agents also may be suitable. One of ordinary skill in the art, with the benefit of this disclosure, will be able to select an appropriate emulsifying agent based on a number of factors, including the temperature of the subterranean formation, the chemical composition of the formation fluids, the composition of the water-in-oil emulsion, and the like.

Another example of a suitable surfactant-based emulsifying agent is an amine surfactant-based emulsifying agent with the general formula wherein R is $C_{12}$-$C_{22}$; R' is independently selected from hydrogen or $C_1$ to $C_3$ alkyl group; A is NH or O, and x+y has a value greater than or equal to one but also less than or equal to three. Preferably the R group may be a $C_{12}$-$C_{22}$ aliphatic hydrocarbon and more preferably is a non-cyclic aliphatic. In one embodiment the R group contains at least one degree of unsaturation, i.e., at least one carbon-carbon double bond. In another embodiment the R group may be a commercially recognized mixture of aliphatic hydrocarbons such as soya, which is a mixture of $C_{14}$ to $C_{20}$ hydrocarbons, or tallow which is a mixture of $C_{16}$ to $C_{20}$ aliphatic hydrocarbons, or tall oil which is a mixture of $C_{14}$ to $C_{18}$ aliphatic hydrocarbons. In another embodiment, one in which the A group is NH, the value of x+y is preferably two with x having a preferred value of one. In yet another embodiment in which the A group is O, the preferred value of x+y is two with the value of x being preferably one. Preferred examples of commercially available amine emulsifying agents include, but are not limited to, Ethomeen T/12 a diethoxylated tallow amine; Ethomeen S/12 a diethoxylated soya amine; Duomeen O a N-oleyl-1,3-diaminopropane, Duomeen T a N-tallow-1,3-diaminopropane, all of which are available from Akzo.

The amount of amine emulsifying agent present in the water-in-oil emulsion of the present invention, as noted above, should be an amount sufficient to help stabilize the water-in-oil emulsion. While the concentration may vary depending on the particular components in the treatment fluid, typically the concentration is less than about 10% by volume of the fluid. Thus, in some embodiments, the emulsifying agent may be present in the water-in-oil emulsion in an amount in the range from about 0.05% to about 10% by weight of the water-in-oil emulsion. In some embodiments, the emulsifying agent may be present in the water-in-oil emulsion in an amount in the range from about 0.1% to about 3% by weight of the water-in-oil emulsion. The amount of the emulsifying agent may depend upon, among other factors, the temperature of the subterranean formation, the chemical composition of the formation fluids, the composition of the water-in-oil emulsion, and the like.

The emulsion compositions of the present invention may further contain additional additives depending upon the end use of the invert emulsion so long as they do not adversely affect the emulsion compositions. For example, wetting agents, organophilic clays, viscosifiers, weighting agents, bridging agents, breakers, stabilizers, bactericides, corrosion inhibitors, oxidizers, fluid loss control agents, loss circulation materials, and the like may be added to the emulsion compositions of this invention if desired. The addition of such additives should be well known to one of skill in the art of formulating subterranean fluids.

Wetting agents that may be suitable that may be used the compositions and methods of this invention include crude tall oil, oxidized crude tall oil, surfactants, organic phosphate esters, modified imidazolines and amidoamines, alkyl aromatic sulfates and sulfonates, and the like, and combinations or derivatives of these. DRILTREAT™ and DEEP-TREAT™ are examples of commercially available wetting agents manufactured and distributed by Halliburton Energy Services, Inc. that may be used in this invention.

Organophilic clays, normally amine treated clays, may be useful as viscosifiers that may be used, the compositions and methods of this invention. Other viscosifiers, such as oil soluble polymers, polyamide resins, polycarboxylic acids and soaps can also be used. The amount of viscosifier used in the composition can vary depending upon the end use of the composition. However, normally about 0.1% to about 6% by weight range is sufficient for most applications. GELTONE® II and SUSPENTONE® are organoclay materials manufactured by Halliburton Energy Services, Inc., that may be used in this invention.

Weighting agents or suitable density materials that may be used the compositions and methods of this invention may include, but are not limited to, galena, hematite, magnetite, iron oxides, manganese oxides, titanium oxides, ilmenite, barite, siderite, celestite, dolomite, calcite, and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

Fluid loss control agents typically act by coating the walls of the borehole as the well is being drilled. Suitable fluid loss control agents that may be used in the compositions and methods of this invention include, but are not limited to, modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% and preferably less than about 5% by weight of the fluid.

In view of the above, one of skill in the art should appreciate the usefulness of the above described water-in-oil emulsion compositions. Thus, one embodiment of the present invention is the use of such water-in-oil emulsion in the drilling, completion and work-over of oil and gas wells. Because many of properties of the water-in-oil emulsion of the present invention are similar to those of conventional invert emulsions, many of the uses of the emulsion compositions of the present invention will be apparent to one skilled in the art with the benefit of this disclosure.

The water-in-oil emulsions of the present invention may be prepared on the fly by diluting a concentrated water-in-oil emulsion with oil to the desired concentration. Concentrated water-in-oil emulsions may have a lower oil to water ratio than the desired oil to water ratio for final application. One of ordinary skill in the art would be able to dilute this water-in-oil emulsion to the desired concentration.

The water-in-oil emulsions of the present invention may be used for any subterranean operation. Suitable subterranean operations may include, but are not limited to, drilling operations, production stimulation operations (e.g., hydraulic fracturing) and well completion operations (e.g., gravel packing).

To facilitate a better understanding of the present invention, the following examples of certain aspects of some embodiments are given. In no way should the following examples be read to limit, or define, the entire scope of the invention.

EXAMPLES

Example 1

Figure 1:
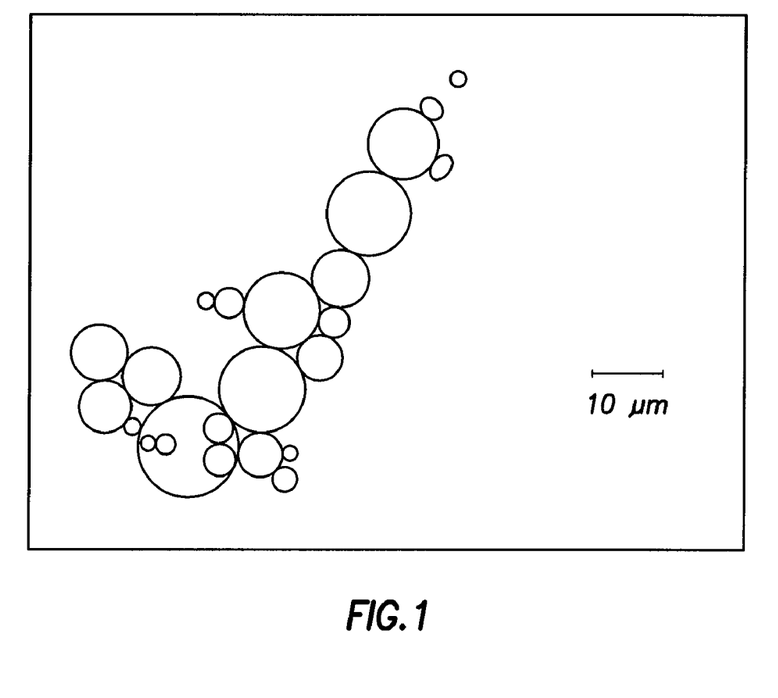
FIG. 1 illustrates a microscopic view of liquid water droplets in a conventional water-in-oil emulsion. The polydispersity of droplet diameters arises from flocculation and coalescence of conventional liquid emulsion droplets.

Example 1 is an example of a conventional water-in-oil emulsion. A water-in-oil emulsion with liquid water-droplet internal phase was prepared utilizing 2.86 grams of mineral oil, 0.88 grams of de-ionized water, and 0.3 grams of an emulsifier. The liquid water droplets formed are illustrated in FIG. 1. As can be seen from FIG. 1, the water droplets do not appear to be well dispersed, with a high tendency of clustering and coalescing.

Example 2

Figure 2:
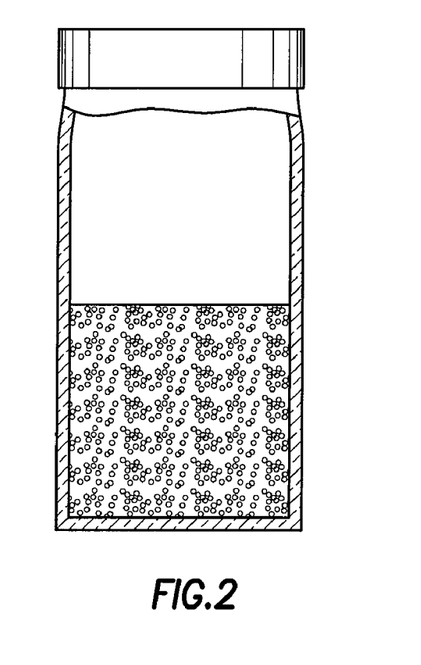
FIG. 2 illustrates a poly(hydroxyethyl acrylate) hydrogel. The entrained air bubbles (small circles) illustrate the viscoelastic properties of the gel.

Example 2 is an example of a representative hydrogel material prepared in an aqueous medium. This type of hydrogel can be similarly formed within the discontinuous phase of a water-in-oil emulsion, as illustrated in examples 3, 4, and 5. In each of these examples, the hydrogel droplets are prepared in situ within the discontinuous phase medium. A hydrogel was prepared utilizing 20.8 grams of de-ionized water, 2.7 grams of hydroxyethyl acrylate, 0.0125 grams of an initiator VA-O44 0.4 grams of KCl, and 0.025 grams of a pH buffer. Polymerization was carried out at 130° F. for 3 hours until the solution became a gel. The resultant gel is illustrated in FIG. 2. The air bubbles trapped in the gel, as can be seen from FIG. 2, are believed to indicate the high viscoelasticity of the gel.

Example 3

Figure 3:
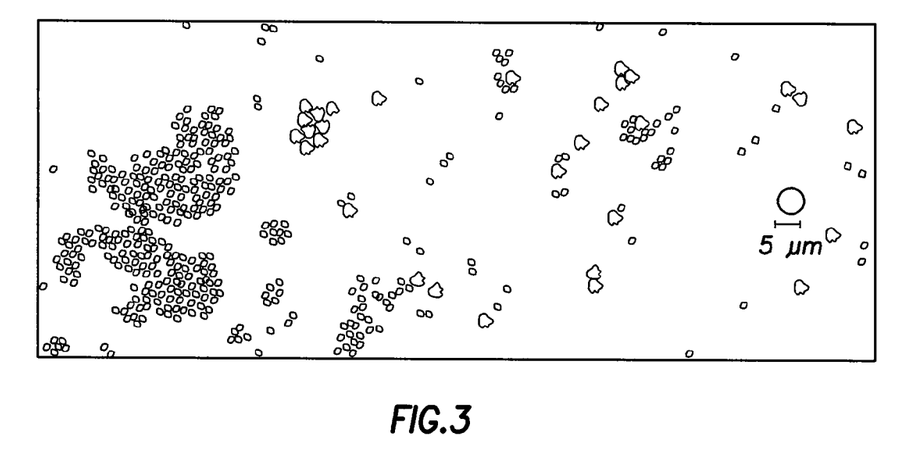
FIG. 3 illustrates a microscopic view of poly(hydroxyethyl acrylate) hydrogel particles (irregular shapes) coexisting with liquid droplets (circular shape) in a water-in-oil emulsion.

The same type of hydrogel droplet as in Example 2 was formed in the discontinuous phase of a water-in-oil emulsion with an emulsifying agent. The continuous phase consisted of 75 grams of EDC 99 DW with 7.5 grams emulsifier BDF-364. The dispersed phase consisted of 20.8 grams of de-ionized water, 2.7 grams of hydroxyethyl acrylate monomer, 0.0125 grams of an initiator, 0.4 grams of KCl, and 0.025 grams of a pH 4 buffer. The mixture was heated to 130° F. for 2 hours with stirring. The hydrogel droplets formed are illustrated in FIG. 3. As can be seen from FIG. 3, the gel particles are more dispersed compared to the water droplets in Example 1. They also appear to have less of a tendency to coalesce.

Example 4

Figure 4:
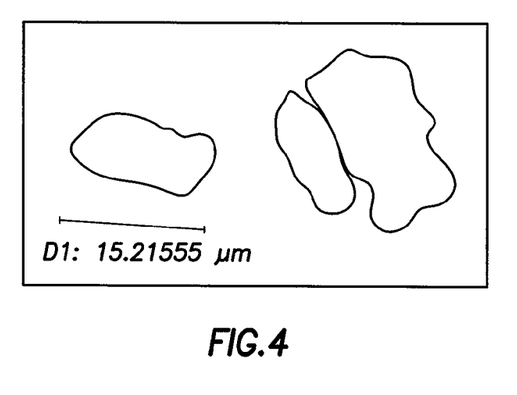
FIG. 4 illustrates a microscopic view (higher magnification) of some poly(hydroxyethyl acrylate) hydrogel particles (irregular shapes) in a water-in-oil emulsion. Unlike the liquid droplets, coalescence is not observed.

A hydrogel droplet was formed in the internal phase of a water-in-oil emulsion with a surfactant-based emulsifying agent and organophilic clay. The continuous phase consisted of 79.7 grams of EDC 99 DW, 7.5 g emulsifier BDF-364, and 2.5 grams of SUSPENTONE (a Baroid product). The dispersed phase consisted of 26.4 grams of de-ionized water, 3.26 grams of hydroxyethyl acrylate monomer, 0.015 grams of an initiator, 0.4 grams of KCl, and 0.03 grams of a pH 4 buffer. The mixture was heated to 130° F. for 4 hours with stirring. The hydrogel droplets formed are illustrated in FIG. 4. As can be seen from FIG. 4, the gel particles are more dispersed compared to the water droplets in Example 1. They also appear to have less of a tendency to coalesce.

Example 5

Figure 5:
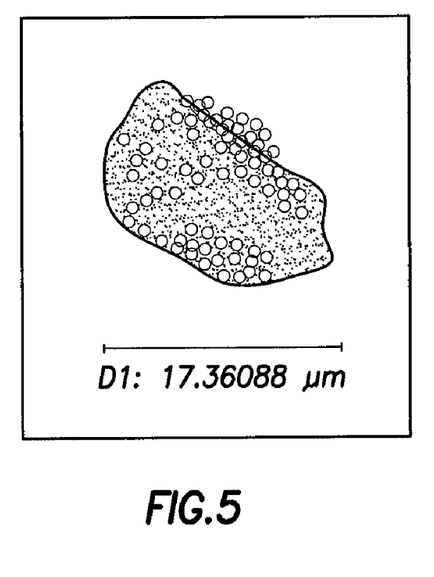
FIG. 5 illustrates a microscopic view of a poly(hydroxyethyl acrylate) hydrogel particle (irregular shape) formed in-situ within a model oil-based drilling fluid Weighting agent particles (circular shape) can be seen on the surface of the gel particle.

A hydrogel droplet was formed in the internal phase of an example oil-based drilling fluid. The continuous phase consisted of 53.13 grams of EDC 99 DW, 5 grams of emulsifier BDF-364, and 1.67 grams of SUSPENTONE (a Baroid product). The dispersed phase consisted of 17.6 grams of de-ionized water, 2.17 grams of hydroxyethyl acrylate monomer, 0.01 grams of an initiator, 0.32 grams of KCl, and 0.02 grams of a pH 4 buffer. 132.6 grams manganese tetraoxide was added as the weighting agent. The mixture was heated to 130° F. for 4 hours with stirring. The hydrogel droplets formed are illustrated in FIG. 5. As can be seen from FIG. 5, the gel particles are highlighted under polarized light with manganese tetraoxide particles adhering on the surface.

Example 6

Example 6 (samples 1-3) is illustrative of a second route of hydrogel incorporation. The hydrogel material was introduced directly into the non-aqueous continuous phase as either a prehydrated gel or a dry material for subsequent in-situ hydration.

Figure 6A:
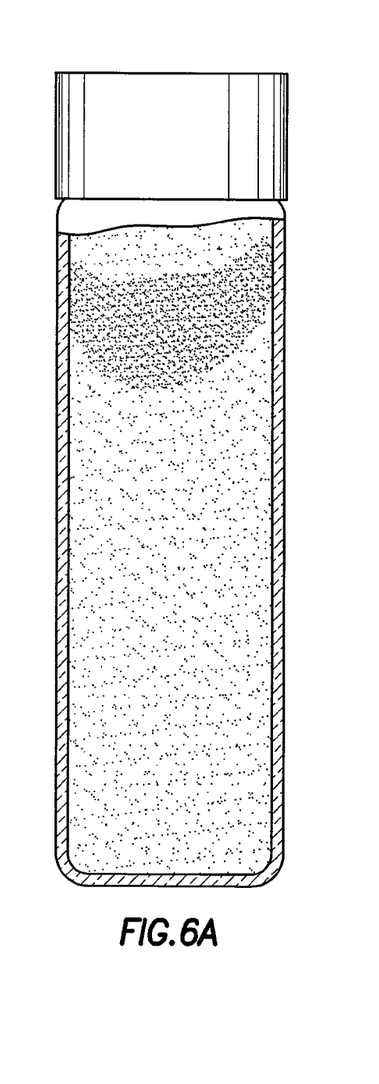
FIG. 6A illustrates the stratification of a conventional oil-based fluid, containing liquid droplets as the internal phase, following high-temperature aging. The dark band represents the quantity of top-oil separation observed.
Figure 6B:
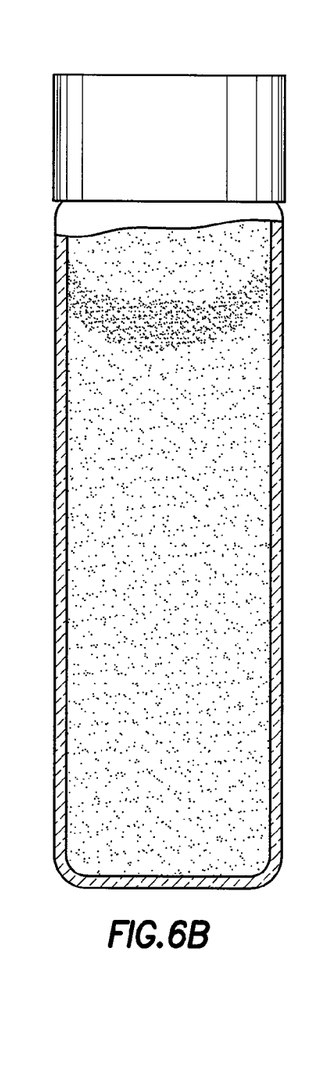
FIG. 6B illustrates the stratification, following high-temperature aging, of the conventional oil-based fluid of FIG. 6A with the addition of a hydrogel-forming polymer (introduced without pre-hydration). The presence of less top-oil indicates increased fluid stability compared to liquid droplet emulsions.
Figure 6C:
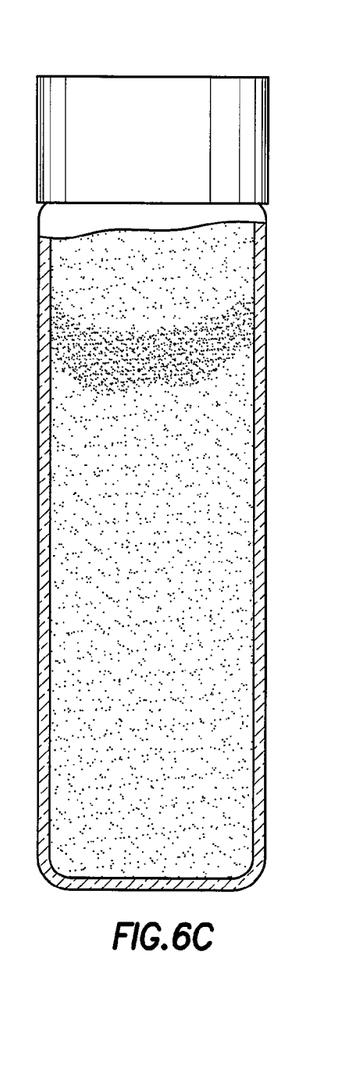
FIG. 6C illustrates the stratification, following high-temperature aging, of the conventional oil-based fluid of FIG. 6A with the addition of a hydrogel-forming polymer (introduced in a pre-hydrated form). The presence of less top-oil indicates increased fluid stability compared to liquid droplet emulsions.
Figure 7A:
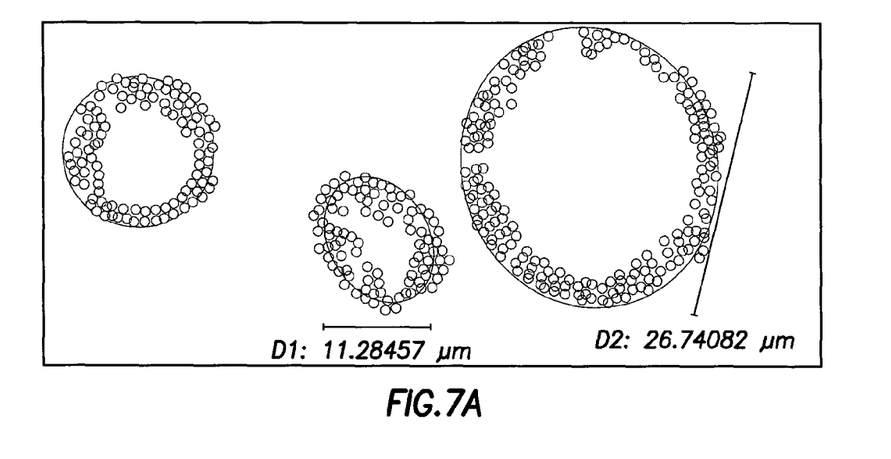
FIG. 7A illustrates the microstructure of the conventional oil-based fluid of fluid 6A following high-temperature aging. Weighting agent material (small circles) can be observed at the interface of liquid emulsion droplets (large circles). Droplet diameter polydispersity can arise from uncontrolled coalescence.
Figure 7B:
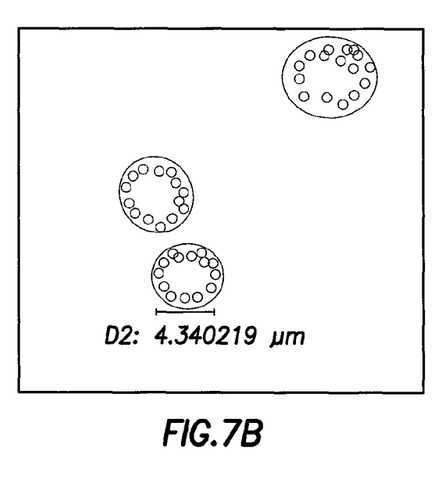
FIG. 7B illustrates the microstructure of the fluid of FIG. 6B following high-temperature aging. Weighting agent material (small circles) can be observed at the surface of the hydrogel particles (large circles). Lack of particle coalescence may contribute to observed fluid stability.
Figure 7C:
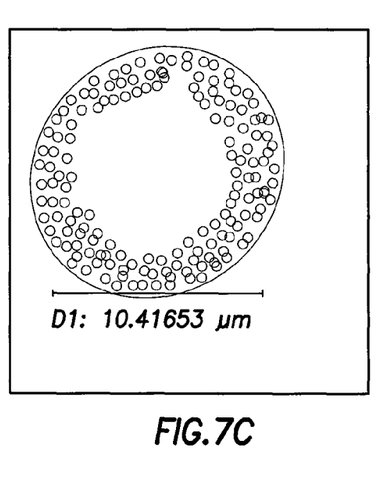
FIG. 7C illustrates the microstructure of the fluid of FIG. 6C following high-temperature aging. Weighting agent material (small circles) can be observed at the surface of the hydrogel particle (large circle). Lack of particle coalescence may contribute to observed fluid stability.

This experiment documents the process of introducing dry water-soluble polymer to a model oil-based drilling fluid, which contains liquid water droplets. Samples 1, 2, and 3 were model fluids of 17.9 pounds per gallon oil-based mud weighted by manganese tetraoxide. In Sample 1, the continuous phase consisted of EDC 99 DW with 15 pounds per barrel emulsifier BDF-364 and 5 pounds per barrel SUSPENTONE (a Baroid product). The dispersed phase consisted of 250,000 parts per million $CaCl_2$ in water solution. In sample 2, 1 pound per barrel DIAMOND SEAL (a Baroid product, high MW water-soluble polymer) was added directly to the model fluid without prehydrating in the brine. In Sample 3, 1 pound per barrel DIAMOND SEAL was added to the model fluid after pre-hydrating in the brine phase. All 3 samples were hand-shaken until well mixed and static aged at 400° F. for 64 hrs. The results are illustrated in FIGS. 6A, 6B, and 6C. As can be seen from FIGS. 6A, 6B, and 6C, the results show that the fluid stability against sagging is improved by the swelling of dry polymer in the internal phase, which leads to internal hydrogel droplets in the invert emulsion. The microscopic structures of Samples 1-3 were analyzed after aging. The results of that analysis are shown in FIGS. 7A, 7B, and 7C. As can be seen from FIGS. 7A, 7B, and 7C, the droplet size seem to follow the order of 1>3>2; this appears to be in agreement with the severity of fluid stratification.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A water-in-oil emulsion composition comprising an oil-based continuous phase and a discontinuous phase that comprises at least a plurality of discrete hydrogel droplets.

2. The water-in-oil emulsion composition of claim 1 wherein the oil-based continuous phase comprises at least one oil-based fluid selected from the group consisting of: an ester based fluid, mineral oil, an internal olefin, an alpha olefin, diesel oil, crude oil, paraffin oil, a low toxicity mineral oil, an olefin, an ester, an amide, an amine, a synthetic oil such as a polyolefin, a polydiorganosiloxane, a siloxane, an organosiloxane, an ether, an acetal, a dialkylcarbonate, a hydrocarbon, and any derivative thereof.

3. The water-in-oil emulsion composition of claim 1 wherein the discontinuous phase comprises at least one non-oleaginous fluid selected from the group consisting of an aqueous-based fluid, glycerin, a glycol, a polyglycol amine, a polyol, and any derivative thereof.

4. The water-in-oil emulsion composition of claim 1 wherein the hydrogel droplets comprise at least one polymer selected from the group consisting of: polybutylene succinate, polybutylene succinate-co-adipate, polyhydroxybutyrate-valerate, polyhydroxybutyratecovalerate, polycaprolactone, a polyester amide, a starch-based polymer, a polyethylene terephthalate-based polymer, sulfonated polyethylene terephthalate, polyethylene oxide, polyethylene, polypropylene, polyvinyl alcohol, an aliphatic aromatic copolyester, polyacrylic acid, polyacrylamide, polyvinylpyrrolidone, a polysaccharide, chitin, chitosan, a protein, an aliphatic polyester, a polylactic acid, a poly(glycolide), a poly($\epsilon$-caprolactone), a poly(hydroxy ester ether), a poly(hydroxybutyrate), a poly(anhydride), a polycarbonate, a poly(orthoester), a poly(amino acid), a poly(ethylene oxide), a poly(propylene oxide), a poly(phosphazene), a polyester amide, a polyamide, any copolymer thereof, and any derivative thereof.

5. The water-in-oil emulsion composition of claim 1 wherein the oil-based continuous phase is present in the range of from about 50% to about 100% by volume of the water-in-oil emulsion composition.

6. The water-in-oil emulsion composition of claim 1 wherein the discontinuous phase comprises about 0.5% to about 100% hydrogel droplets.

7. The water-in-oil emulsion composition of claim 1 wherein the discontinuous phase is present in the range of from about 5% to about 50% by volume of the water-in-oil emulsion composition.

8. The water-in-oil emulsion composition of claim 1 wherein the hydrogel droplets have a diameter of less than 100 microns.

9. A method comprising:
providing a water-in-oil emulsion composition comprising an oil-based continuous phase and a discontinuous phase that comprises at least a plurality of discrete hydrogel droplets; and placing the water-in-oil emulsion composition in a well bore penetrating a subterranean formation.

10. The water-in-oil emulsion composition of claim 9 wherein the oil-based continuous phase comprises at least one oil-based fluid selected from the group consisting of: an ester based fluid, mineral oil, an internal olefin, an alpha olefin, diesel oil, crude oil, paraffin oil, a low toxicity mineral oil, an olefin, an ester, an amide, an amine, a synthetic oil such as a polyolefin, a polydiorganosiloxane, a siloxane, an organosiloxane, an ether, an acetal, a dialkylcarbonate, a hydrocarbon, and any derivative thereof.

11. The water-in-oil emulsion composition of claim 9 wherein the discontinuous phase comprises at least one non-oleaginous fluid selected from the group consisting of: an aqueous-based fluid, glycerin, a glycol, a polyglycol amine, a polyol, and any derivative thereof.

12. The water-in-oil emulsion composition of claim 9 wherein the hydrogel droplets comprise at least one polymer selected from the group consisting of polybutylene succinate, polybutylene succinate-co-adipate, polyhydroxybutyrate-valerate, polyhydroxybutyratecovalerate, polycaprolactone, a polyester amide, a starch-based polymer, a polyethylene terephthalate-based polymer, sulfonated polyethylene terephthalate, polyethylene oxide, polyethylene, polypropylene, polyvinyl alcohol, an aliphatic aromatic copolyester, polyacrylic acid, polyacrylamide, polyvinylpyrrolidone, a polysaccharide, chitin, chitosan, a protein, an aliphatic polyester, a polylactic acid, a poly(glycolide), a poly($\epsilon$-caprolactone), a poly(hydroxy ester ether), a poly(hydroxybutyrate), a poly(anhydride), a polycarbonate, a poly(orthoester), a poly(amino acid), a poly(ethylene oxide), a poly(propylene oxide), a poly(phosphazene), a polyester amide, a polyamide, any copolymer thereof, and any derivative thereof.

13. The water-in-oil emulsion composition of claim 9 wherein the oil-based continuous phase is present in the range of from about 50% to about 100% by volume of the water-in-oil emulsion composition.

14. The water-in-oil emulsion composition of claim 9 wherein the discontinuous phase comprises about 0.5% to about 100% hydrogel droplets.

15. A method comprising:
providing drilling fluid comprising a water-in-oil emulsion composition, wherein the water-in-oil emulsion composition comprises an oil-based continuous phase and a discontinuous phase that comprises at least a plurality of discrete hydrogel droplets; and drilling at least a portion of a well bore in a subterranean formation with the drilling fluid.

16. The water-in-oil emulsion composition of claim 15 wherein the oil-based continuous phase comprises at least one oil-based fluid selected from the group consisting of: an ester based fluid, mineral oil, an internal olefin, an alpha olefin, diesel oil, crude oil, paraffin oil, a low toxicity mineral oil, an olefin, an ester, an amide, an amine, a synthetic oil such as a polyolefin, a polydiorganosiloxane, a siloxane, an organosiloxane, an ether, an acetal, a dialkylcarbonate, a hydrocarbon, and any derivative thereof.

17. The water-in-oil emulsion composition of claim 15 wherein the discontinuous phase comprises at least one non-oleaginous fluid selected from the group consisting of: an aqueous-based fluid, glycerin, a glycol, a polyglycol amine, a polyol, and any derivative thereof.

18. The water-in-oil emulsion composition of claim 15 wherein the hydrogel droplets comprise at least one polymer selected from the group consisting of polybutylene succinate, polybutylene succinate-co-adipate, polyhydroxybutyrate-valerate, polyhydroxybutyratecovalerate, polycaprolactone, a polyester amide, a starch-based polymer, a polyethylene terephthalate-based polymer, sulfonated polyethylene terephthalate, polyethylene oxide, polyethylene, polypropylene, polyvinyl alcohol, an aliphatic aromatic copolyester, polyacrylic acid, polyacrylamide, polyvinylpyrrolidone, a polysaccharide, chitin, chitosan, a protein, an aliphatic polyester, a polylactic acid, a poly(glycolide), a poly($\epsilon$-caprolactone), a poly(hydroxy ester ether), a poly(hydroxybutyrate), a poly(anhydride), a polycarbonate, a poly(orthoester), a poly(amino acid), a poly(ethylene oxide), a poly(propylene oxide), a poly(phosphazene), a polyester amide, a polyamide, any copolymer thereof, and any derivative thereof.

19. The water-in-oil emulsion composition of claim 15 wherein the oil-based continuous phase is present in the range of from about 50% to about 100% by volume of the water-in-oil emulsion composition.

20. The water-in-oil emulsion composition of claim 15 wherein the discontinuous phase comprises about 0.5% to about 100% hydrogel droplets.

21. A method of preparing a water-in-oil emulsion composition comprising hydrogel droplets comprising:
providing a water-in-oil emulsion composition comprising an oil-based continuous phase and a discontinuous phase; adding a monomer, an initiator, and optionally a crosslinking agent to the water-in-oil emulsion composition; and allowing the monomer to disperse in the discontinuous phase and react with the initiator and optionally the crosslinking agent to form at least a plurality of discrete hydrogel droplets.

22. The method of claim 21 wherein the monomer comprises at least one monomer selected from the group consisting of: a butylene, succinate-co-adipate, hydroxybutyratevalerate, hydroxybutyrate-covalerate, a caprolactone, an amide, a starch-based monomer, an ethylene terephthalate-based monomer, sulfonated ethylene terephthalate, an ethylene oxide, an ethylene, propylene, a vinyl alcohol, an aliphatic aromatic ester, acrylic acid, acrylamide, vinyl pyrrolidone, a monosaccharide, a chitin, a chitosan, a protein, an aliphatic ester, a lactic acid, a glycolide, an $\epsilon$-caprolactone, a hydroxy ester ether, a hydroxybutyrate, an anhydride, a carbonate, an orthoester, an amino acid, an ethylene oxide, a propylene oxide, a phosphazene, an ether ester, an ester amide, an amide, any copolymer thereof, and any derivative thereof.

23. The method of claim 21 wherein the amount of monomer added to the water-in-oil emulsion composition is from about 0.5% to about 10% by weight of the discontinuous phase.

24. The method of claim 21 wherein the crosslinking agent is added to the water-in-oil emulsion composition in an amount in the range of 0.01% to about 5% by weight of the monomer.

* * * * *